US012564123B2

(12) United States Patent
Plattner

(10) Patent No.: US 12,564,123 B2
(45) Date of Patent: Mar. 3, 2026

(54) METHOD AND SYSTEMS FOR USING SENSORS TO DETERMINE RELATIVE SEED OR PARTICLE SPEED

(71) Applicant: Precision Planting LLC, Tremont, IL (US)

(72) Inventor: Chad E. Plattner, Tremont, IL (US)

(73) Assignee: Precision Planting LLC, Tremont, IL (US)

( * ) Notice: Subject to any disclaimer, the term of this patent is extended or adjusted under 35 U.S.C. 154(b) by 971 days.

(21) Appl. No.: 17/632,199

(22) PCT Filed: Jul. 8, 2020

(86) PCT No.: PCT/IB2020/056412
§ 371 (c)(1),
(2) Date: Feb. 1, 2022

(87) PCT Pub. No.: WO2021/019331
PCT Pub. Date: Feb. 4, 2021

(65) Prior Publication Data
US 2022/0279705 A1 Sep. 8, 2022

Related U.S. Application Data

(60) Provisional application No. 62/881,684, filed on Aug. 1, 2019.

(51) Int. Cl.
*A01C 7/10* (2006.01)
*A01C 7/06* (2006.01)
*A01C 7/08* (2006.01)

(52) U.S. Cl.
CPC ................ *A01C 7/105* (2013.01); *A01C 7/06* (2013.01); *A01C 7/084* (2013.01); *A01C 7/102* (2013.01)

(58) Field of Classification Search
CPC ........... A01C 7/105; A01C 7/06; A01C 7/084; A01C 7/102; A01C 7/081
See application file for complete search history.

(56) References Cited

U.S. PATENT DOCUMENTS

| | | | | |
|---|---|---|---|---|
| 6,158,363 | A | * 12/2000 | Memory ................ | A01C 7/102 701/50 |
| 6,192,813 | B1 | 2/2001 | Memory et al. | |
| 6,208,255 | B1 | 3/2001 | Conrad et al. | |

(Continued)

FOREIGN PATENT DOCUMENTS

| | | |
|---|---|---|
| EP | 3 340 766 A1 | 7/2018 |
| WO | 2018/204196 A1 | 11/2018 |

OTHER PUBLICATIONS

UK Intellectual Property Office, Search Report for related UK Application No. GB 2000394.3, dated Jul. 8, 2020.

(Continued)

*Primary Examiner* — Sohana Tanju Khayer

(57) ABSTRACT
In one embodiment, a processing system (300) comprises memory (314) to store sensor data and processing logic (316) is coupled to the memory. The processing logic is configured to obtain sensor data from at least one sensor (150, 500) for sensing flow of a product through a product line (122) of an agricultural implement (100) and to determine a relative product speed for product flowing through the product line with respect to other product lines of the agricultural implement based on the sensor data.

19 Claims, 10 Drawing Sheets

(56) References Cited

U.S. PATENT DOCUMENTS

| | | | |
|---|---|---|---|
| 2012/0279314 A1 | 11/2012 | Hien et al. | |
| 2015/0059626 A1* | 3/2015 | Conrad | A01M 7/0092 |
| | | | 111/120 |
| 2015/0271989 A1* | 10/2015 | Kinch | A01C 21/005 |
| | | | 701/50 |
| 2018/0255698 A1* | 9/2018 | Körösi | A01C 7/081 |
| 2019/0285448 A1 | 9/2019 | Conrad et al. | |
| 2019/0289776 A1* | 9/2019 | Rempel | A01C 7/107 |

OTHER PUBLICATIONS

European Patent Office, International Search Report for related International Application No. PCT/IB2020/056412, mail date Sep. 17, 2020.

* cited by examiner

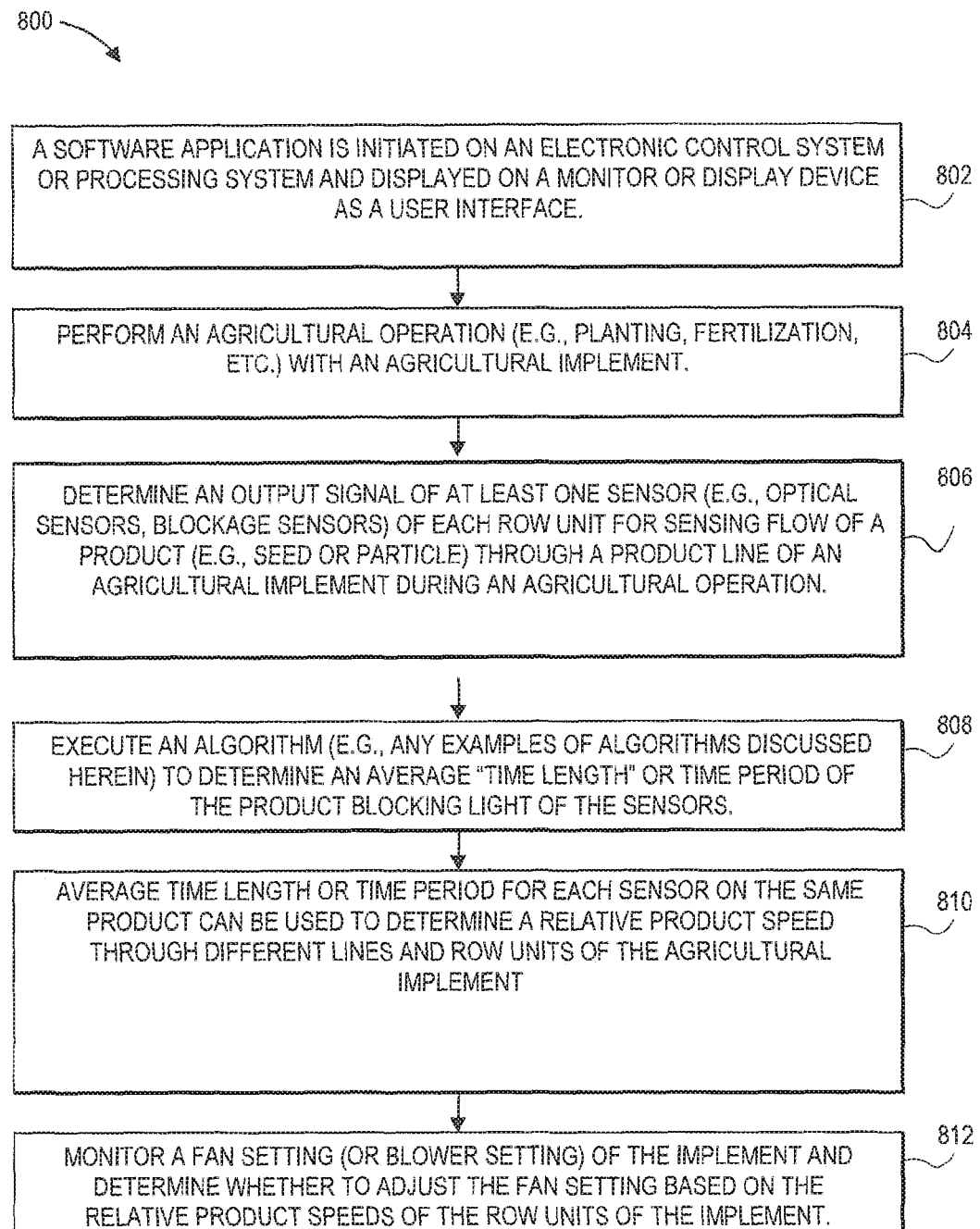

800

A SOFTWARE APPLICATION IS INITIATED ON AN ELECTRONIC CONTROL SYSTEM OR PROCESSING SYSTEM AND DISPLAYED ON A MONITOR OR DISPLAY DEVICE AS A USER INTERFACE. 802

PERFORM AN AGRICULTURAL OPERATION (E.G., PLANTING, FERTILIZATION, ETC.) WITH AN AGRICULTURAL IMPLEMENT. 804

DETERMINE AN OUTPUT SIGNAL OF AT LEAST ONE SENSOR (E.G., OPTICAL SENSORS, BLOCKAGE SENSORS) OF EACH ROW UNIT FOR SENSING FLOW OF A PRODUCT (E.G., SEED OR PARTICLE) THROUGH A PRODUCT LINE OF AN AGRICULTURAL IMPLEMENT DURING AN AGRICULTURAL OPERATION. 806

EXECUTE AN ALGORITHM (E.G., ANY EXAMPLES OF ALGORITHMS DISCUSSED HEREIN) TO DETERMINE AN AVERAGE "TIME LENGTH" OR TIME PERIOD OF THE PRODUCT BLOCKING LIGHT OF THE SENSORS. 808

AVERAGE TIME LENGTH OR TIME PERIOD FOR EACH SENSOR ON THE SAME PRODUCT CAN BE USED TO DETERMINE A RELATIVE PRODUCT SPEED THROUGH DIFFERENT LINES AND ROW UNITS OF THE AGRICULTURAL IMPLEMENT 810

MONITOR A FAN SETTING (OR BLOWER SETTING) OF THE IMPLEMENT AND DETERMINE WHETHER TO ADJUST THE FAN SETTING BASED ON THE RELATIVE PRODUCT SPEEDS OF THE ROW UNITS OF THE IMPLEMENT. 812

FIG. 8

METHOD AND SYSTEMS FOR USING SENSORS TO DETERMINE RELATIVE SEED OR PARTICLE SPEED

TECHNICAL FIELD

Embodiments of the present disclosure relate to a method and systems for using sensors to determine relative seed or particle speed through a seed or particle line of an agricultural implement.

BACKGROUND

Air seeders have a primary distribution system and a secondary distribution system. Seeds and optionally fertilizer are fed from hoppers into the primary distribution system and are conveyed by air to the secondary distribution system. A manifold between the primary distribution system and the secondary distribution system divides the feed so that the secondary distribution system delivers seeds/fertilizer to each row. Seeds/fertilizer are conveyed by air.

Seed or fertilizer sensors on agricultural equipment have typically been optical sensors. When a seed or particle passes through the optical sensor a light beam is broken and a seed or particle is then detected. These sensors output a signal proportional to the time that the seed or particle blocks light from the photodetector.

BRIEF DESCRIPTION OF THE DRAWINGS

The present disclosure is illustrated by way of example, and not by way of limitation, in the figures of the accompanying drawings and in which:

FIG. 8 illustrates a flow diagram of one embodiment for a method 800 of using blockage sensors to determine relative product speed (e.g., relative seed or particle speed).

BRIEF SUMMARY

In one embodiment, a processing system comprises memory to store sensor data and processing logic is coupled to the memory. The processing logic is configured to obtain sensor data from at least one sensor for sensing flow of a product through a product line of an agricultural implement and to determine a relative product speed for product flowing through the product line with respect to other product lines of the agricultural implement based on the sensor data.

DETAILED DESCRIPTION

All references cited herein are hereby incorporated by reference in their entireties. However, in the event of a conflict between a definition in the present disclosure and one in a cited reference, the present disclosure controls.

Figure 1:
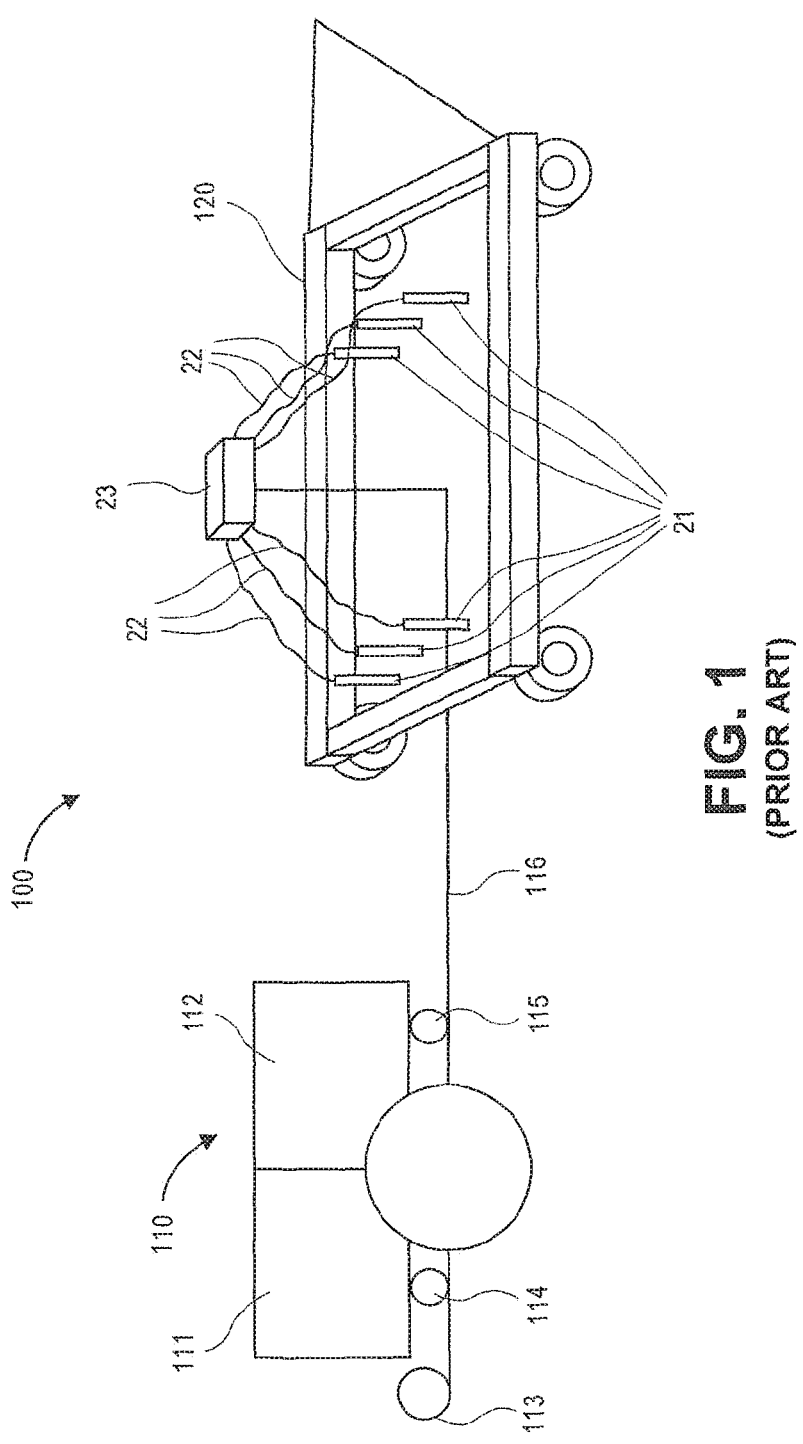
FIG. 1 illustrates a prior art air seeder.

FIG. 1 illustrates a typical air seeder 100. Air seeder 100 includes a cart 110 and frame 120. Cart 110 has hopper 111 and hopper 112 for storing seed and fertilizer, respectively. A main product line 116 is connected to a fan 113 for conveying seed and fertilizer conveyed from meter 114 and meter 115, respectively. Main product line 116 feeds seed and fertilizer to manifold tower 23. Seed and fertilizer are distributed through manifold tower 23 to secondary product lines 22 to openers 21.

While the description below is for control of a manifold tower 123 of one section of an air seeder 100, the same system can be applied to each section.

Figure 2:
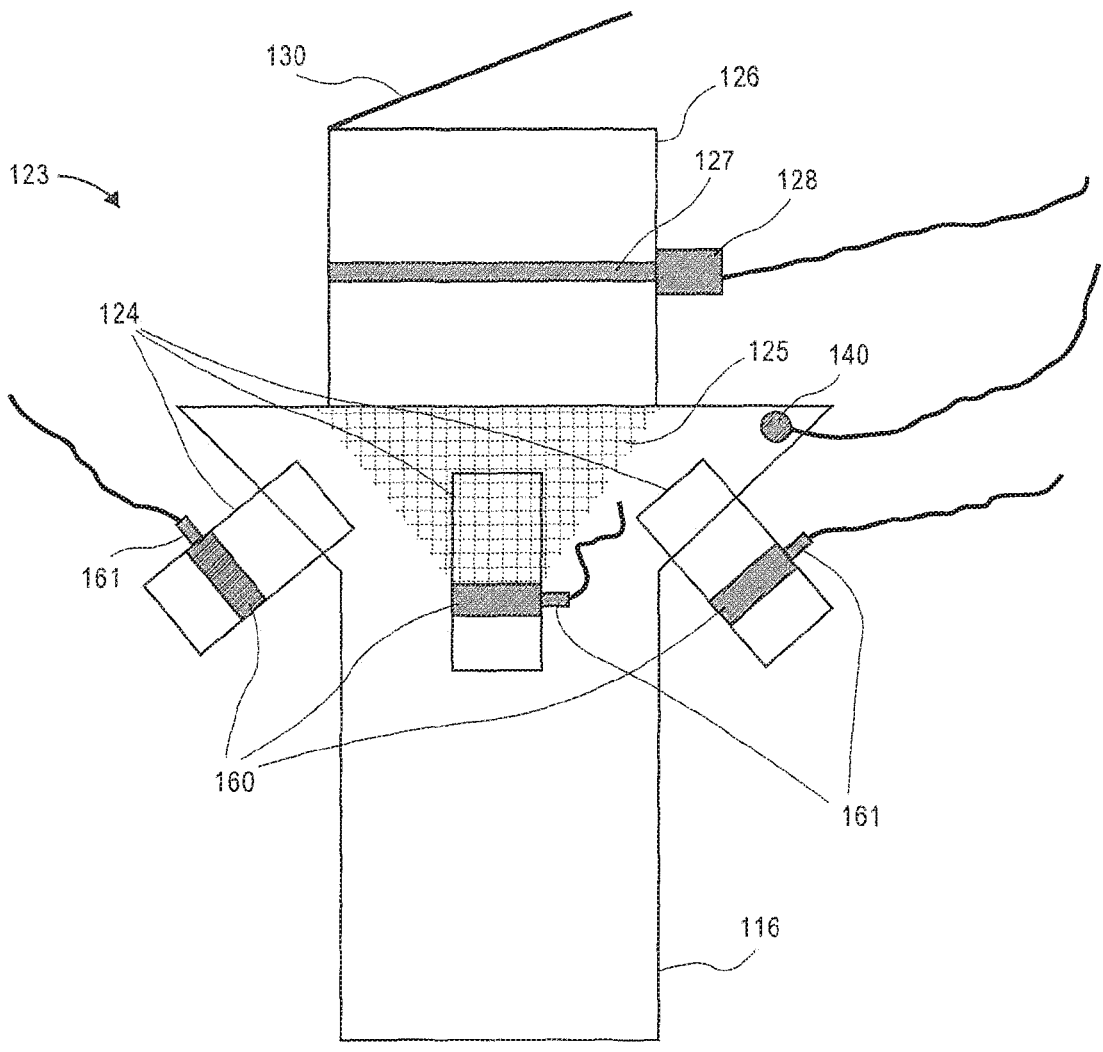
FIG. 2 illustrates an air seeder tower having a vent valve and an actuator for the valve according to one embodiment.

FIG. 2 illustrates manifold tower 123. Manifold tower 123 has main product line 116 providing seed and optionally fertilizer in a flow of air. The main product line 116 is connected to a fan 113 (or blower 113) for conveying seed and fertilizer conveyed from seed meters. Seed/fertilizer impact screen 125 has a mesh size to prevent passage of seed and/or fertilizer. Seeds/fertilizer fall into outlets 124 (or exit ports) and feed into secondary product lines 122. Above screen 125 is a tower 126 which contains a valve 127. Valve 127 can be any type of valve that can be actuated. In one embodiment, valve 127 is a butterfly valve. Valve 127 is actuated by actuator 128, which is disposed on tower 126. Actuator 128 is in signal contact with electrical control system 300. Optionally, a lid 130 is pivotably attached to tower 126 to cover tower 126 when no air is flowing. When air is flowing, lid 130 raises by the force of air flowing through tower 126, and when air is not flowing, lid 130 closes tower 126.

In one embodiment, which is illustrated in FIG. 2, manifold tower 123 further includes a pressure sensor 140 disposed in the manifold tower 123. In another embodiment, pressure sensor 140 is disposed in at least one secondary product line 122. Pressure sensor 140 is in signal communication with electrical control system 300. This can provide a closed loop feedback control of valve 127. In another embodiment, electrical control system 300 measures the pressure at pressure sensor 140 in the manifold tower 123 and the pressure sensor 140 in the secondary product line 122 and calculates a difference between each pressure sensor. Electrical control system 300 can control based on the pressure difference.

Figure 3:
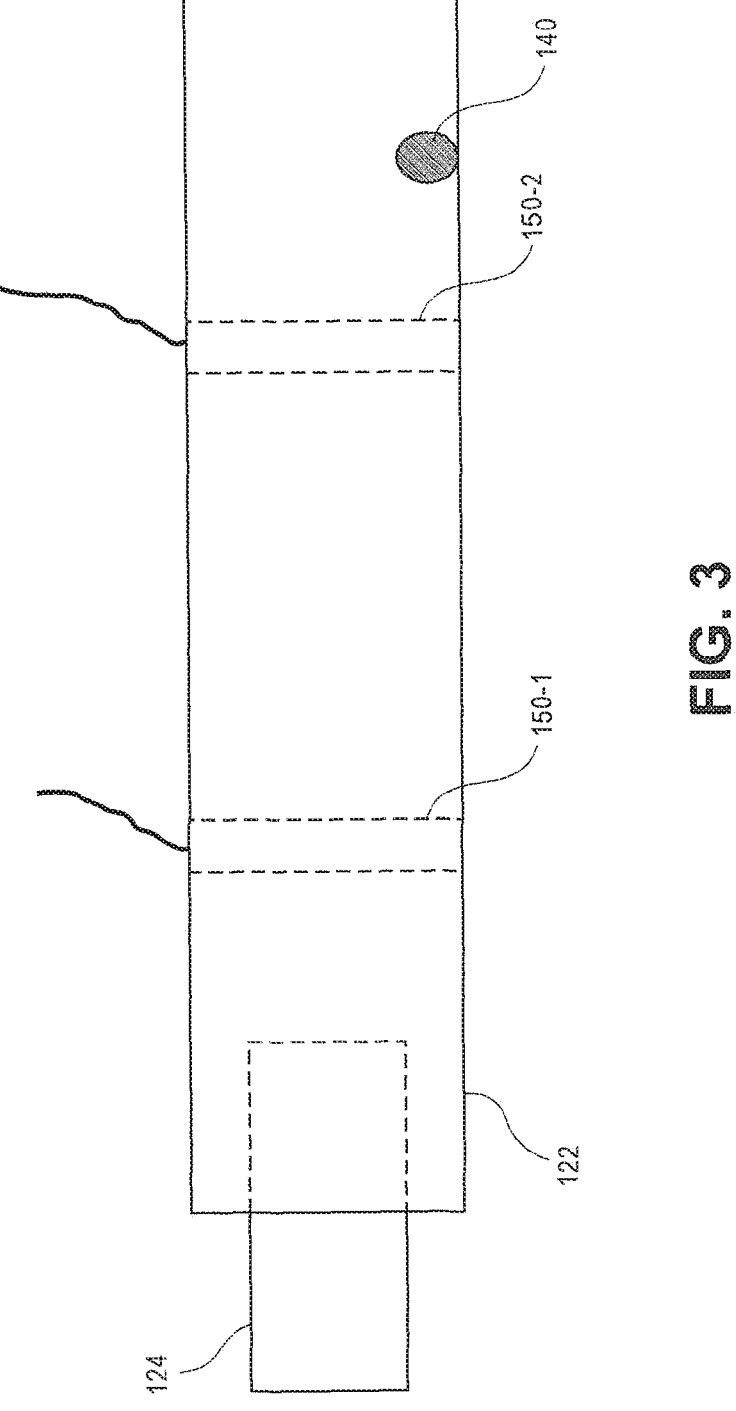
FIG. 3 illustrates a secondary product line having flow sensors according to one embodiment.

In another embodiment, which is illustrated in FIG. 3, there are a first particle sensor 150-1 and a second particle sensor 150-2 disposed serially within at least one secondary product line 122. First particle sensor 150-1 and second particle sensor 150-2 can be disposed individually or as parts within one unit. First particle sensor 150-1 and second particle sensor 150-2 are spaced at a distance such that a waveform measured at the first particle sensor 150-1 will be duplicated at the second particle sensor 150-2. As seeds travel through an air seeder, they will not flow in a uniform distribution all of the time. In a selected cross section, there can be one, two, three, four, five, or more seeds together. As the seeds travel over a distance, the distribution of seeds in each grouping can expand or condense. Over a short distance, the grouping will remain uniform. Each grouping of seeds will generate a different waveform in a particle sensor. The waveforms from a plurality of groupings will create a pattern in the first particle sensor 150-1. When this pattern is then detected at the second particle sensor 150-2, the time difference between each of these measurements is then divided by the distance between first particle sensor 150-1 and second particle sensor 150-2 to determine the speed of seeds/fertilizer in the secondary product line 122. Using the speed, electronic control system 300 can actuate actuator 128 to change the amount of air exiting tower 126 to change the speed of seed/fertilizer in the secondary product line 122.

An example of a particle sensor is Wavevision Sensor from Precision Planting LLC, and which is described in U.S. Pat. No. 6,208,255. First particle sensor 150-1 and second particle sensor 150-2 are in signal communication with electrical control system 300. This can provide a closed loop feedback control of valve 127.

While both the pressure sensor 140 and the particle sensors 150-1, 150-2 are illustrated, only one is needed for the closed loop feedback control.

In another embodiment that is illustrated in FIG. 2, there can be at least one valve (e.g., valve 160) disposed in each outlet 124 (or exit port) and actuated by actuator 161, which is in signal communication with electrical control system 300. Each actuator 161 (or actuators) can be individually controlled to further regulate flow with at least one valve in each secondary product line 122. The pressure sensor 140, an optical sensor, or particle sensors 150-1, 150-2 in each secondary product line 122 can provide the measurement for controlling each actuator 122.

Figures 4A, 4B:
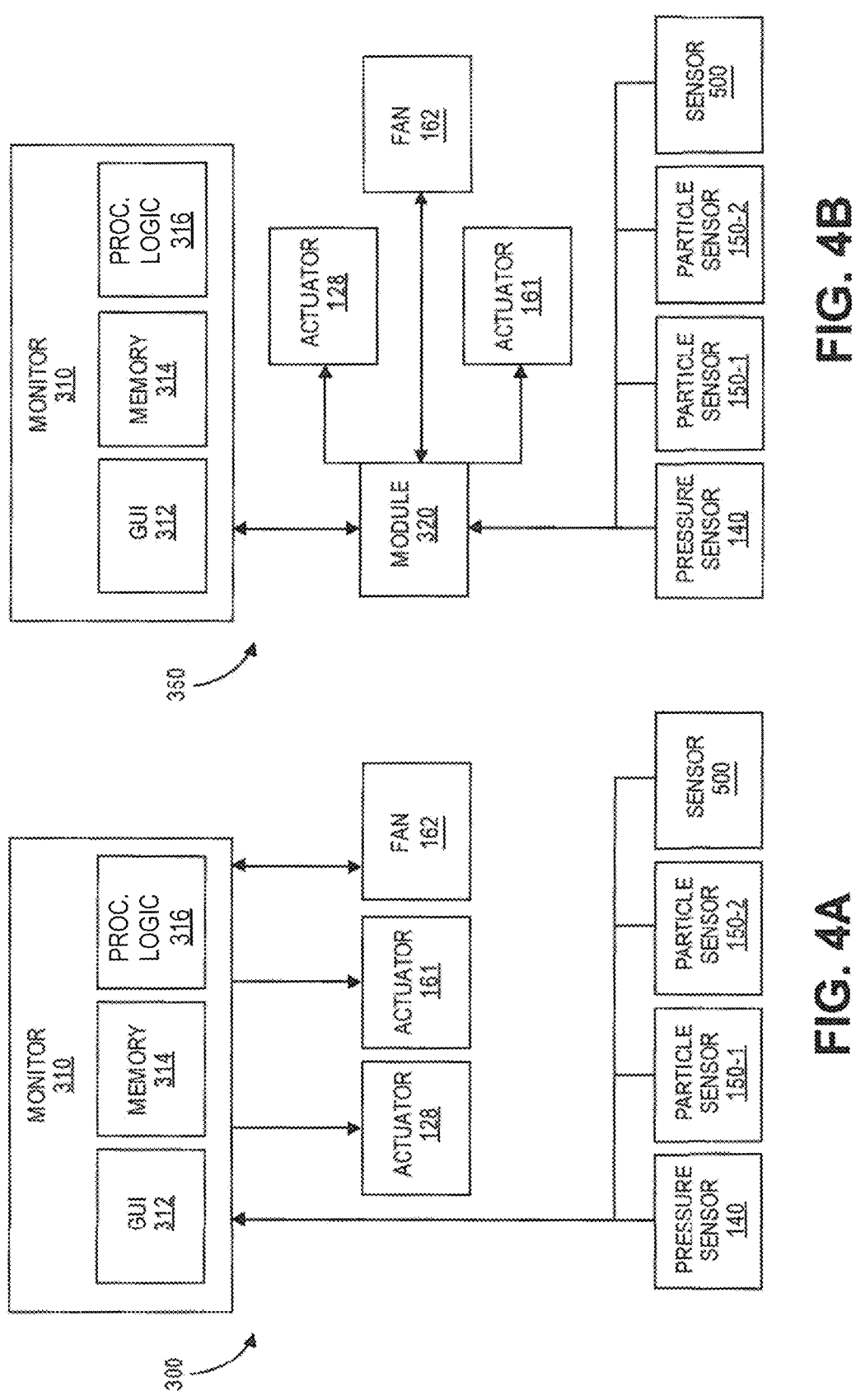
FIG. 4A schematically illustrates an embodiment of an electrical control system.
FIG. 4B schematically illustrates an embodiment of an electrical control system

Electrical control system 300 is illustrated schematically in FIG. 4A in accordance with one embodiment. In the electrical control system 300, the monitor 310 is in signal communication with actuator 128, actuator 161, pressure sensor 140, optical sensor 500 (e.g., blockage sensor 500), particle sensors 150-1, 150-2, and fan 162. It should be appreciated that the monitor 310 comprises an electrical controller. Monitor 310 includes processing logic 316 (e.g., a central processing unit (CPU) 316), a memory 314, and optionally a graphical user interface (GUI) 312, which allows a user to view and enter data into the monitor 310. The monitor 310 can be of a type disclosed in U.S. Pat. No. 8,386,137. For example, monitor 310 can be a planter monitor system that includes a visual display and user interface, preferably a touch screen graphic user interface (GUI). The touchscreen GUI is preferably supported within a housing which also houses a microprocessor, memory and other applicable hardware and software for receiving, storing, processing, communicating, displaying and performing various features and functions. The planter monitor system preferably cooperates and/or interfaces with various external devices and sensors.

An alternative electrical control system 350 is illustrated in FIG. 4B, which includes a module 320. Module 320 receives signals from pressure sensor 140, optical sensor 500 (e.g., blockage sensor 500), particle sensors 150-1, 150-2, and fan 162, which can be provided to monitor 310 to output on GUI 312. Module 320 can also provide control signals to actuator 128, actuator 161 and fan 162, which can be based on operator input into monitor 310.

In operation of the closed loop feedback control, monitor 310 receives a signal from the pressure sensor, optical sensor 500 (e.g., blockage sensor 500), and/or particle sensors 150-1, 150-2. The monitor 310 uses the pressure signal, optical sensor signal, and/or the particle signal to set a fan speed of fan 162 to regulate air speed of particles or seed in product lines. The monitor 310 may also use the pressure signal, optical sensor signal, and/or the particle signal to set selected position of actuator 128 to control valve 127 to regulate the amount of air leaving tower 126. Monitor 310 sends a signal to actuator 128 to effect this change. This in turn controls the amount of air flow in secondary product lines 122 to convey seeds/fertilizer to the trench with the appropriate force and/or speed to place the seeds/fertilizer in the trench without having the seeds/fertilizer bounce out of the trench.

In one example, the module 320 is located on an implement or on a tractor. The module 320 receives sensor data from the sensors that are located on an implement. The module processes the sensor data to perform operations of methods discussed herein or the module sends the sensor data to processing logic to perform operations of methods discussed herein.

Figure 5:
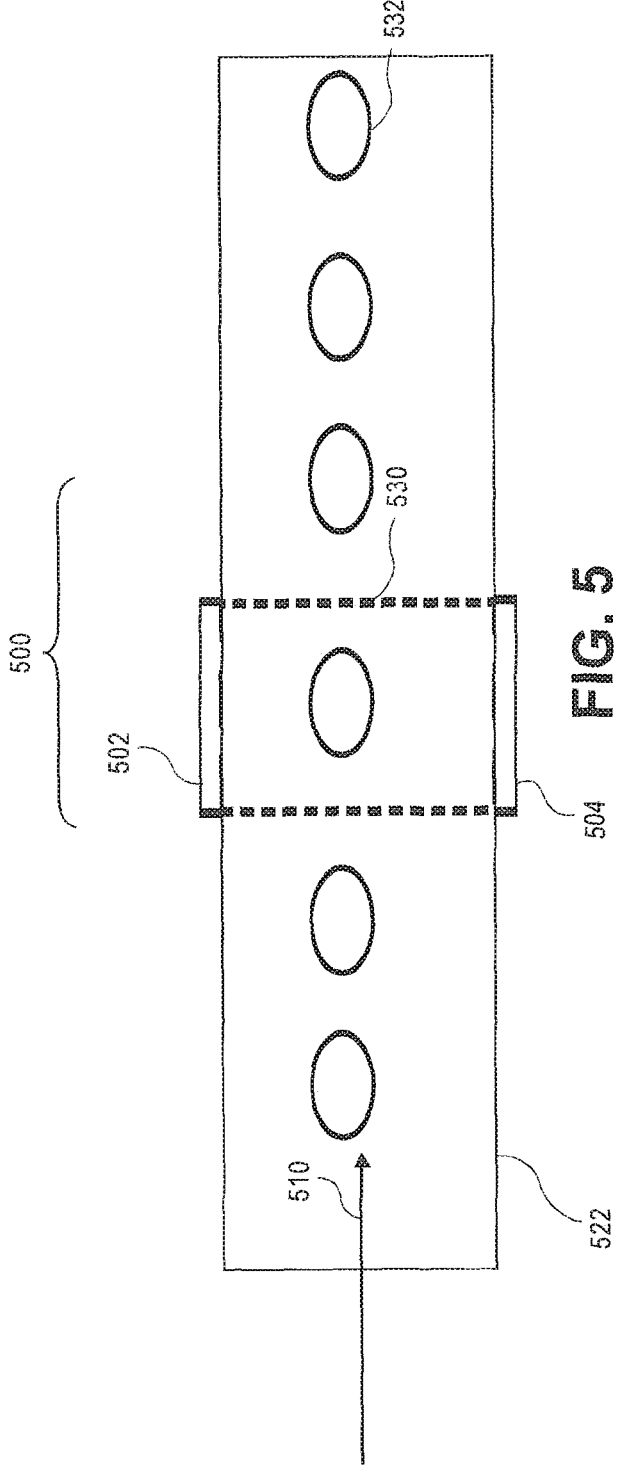
FIG. 5 illustrates a secondary product line having an optical sensor according to one embodiment.

FIG. 5 illustrates a blockage sensor (e.g., optical seed sensor) for detecting flow through a product line, secondary product line, or pipe in accordance with one embodiment. The sensor 500 is positioned on a line 522 (e.g., secondary product line) or pipe 522 or in close proximity to the line 522 or pipe 522. The sensor (or optical sensors) includes a transmitter 504 to transmit light 530. A receiver 502 receives this light 530 if no blockage. Flow of seed or particles 532 in a direction 510 through this light 530 (e.g., infrared light) causes a temporary blockage of the received light.

Figure 6:
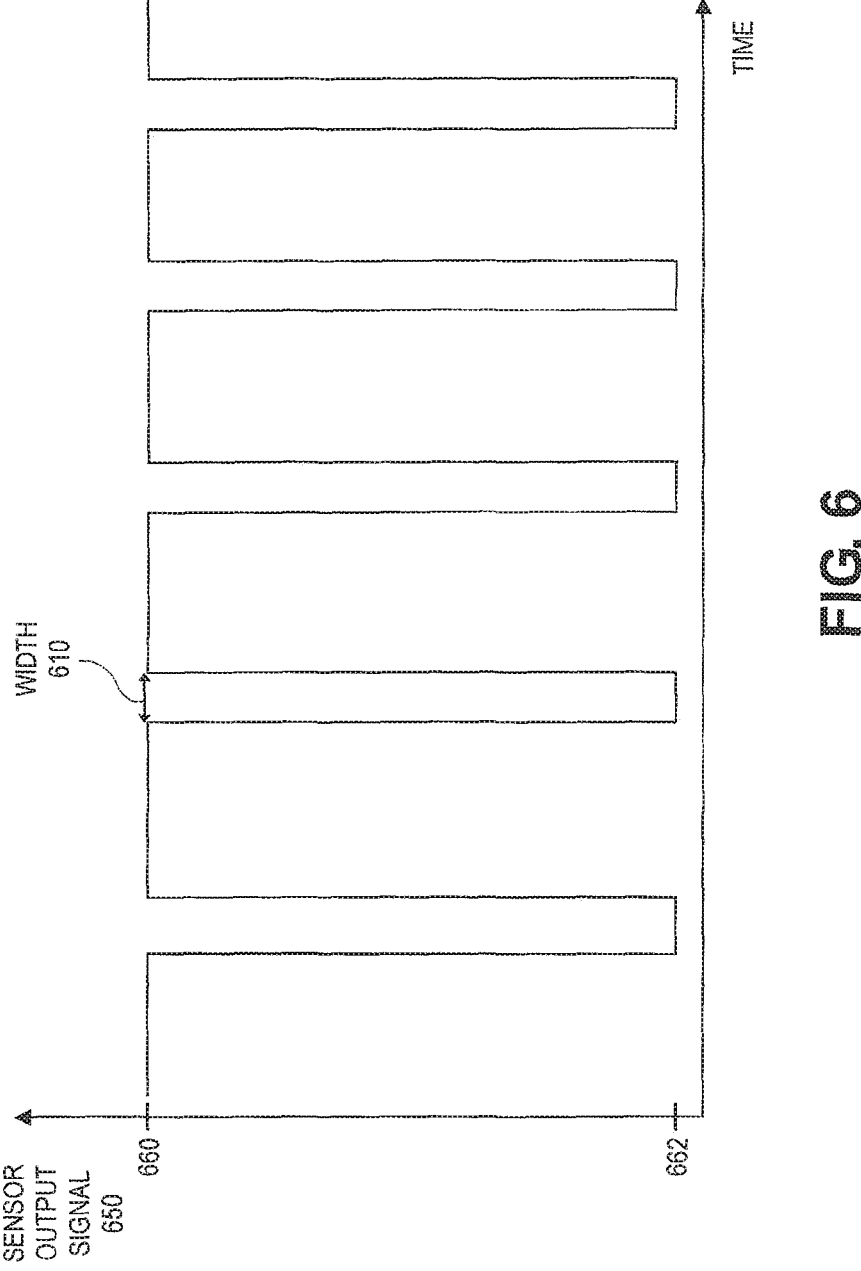
FIG. 6 illustrates an output signal of a blockage sensor 500 in accordance with one embodiment.

FIG. 6 illustrates an output signal of a blockage sensor 500 in accordance with one embodiment. The sensor 500 has a voltage level 660 for no blockage (e.g., receiver receiving all light or nearly all light that is transmitted from the transmitter) and a reduced voltage level 662 due to seed or particles causing blockage of the light that is received by the receiver of the sensor 500. A signal width 610 is proportional to a time period that the seed or particle blocks light from the receiver or photodetector of the sensor.

It was discovered that by using a most often occurring length of the output signal (e.g., width 610), the result would be the average "time length" of a single particle of the product flowing or an average time period of a single particle of the product blocking light of the optical sensor. All sensors on the same product can be compared to each other to get a relative product speed.

Figure 7A:
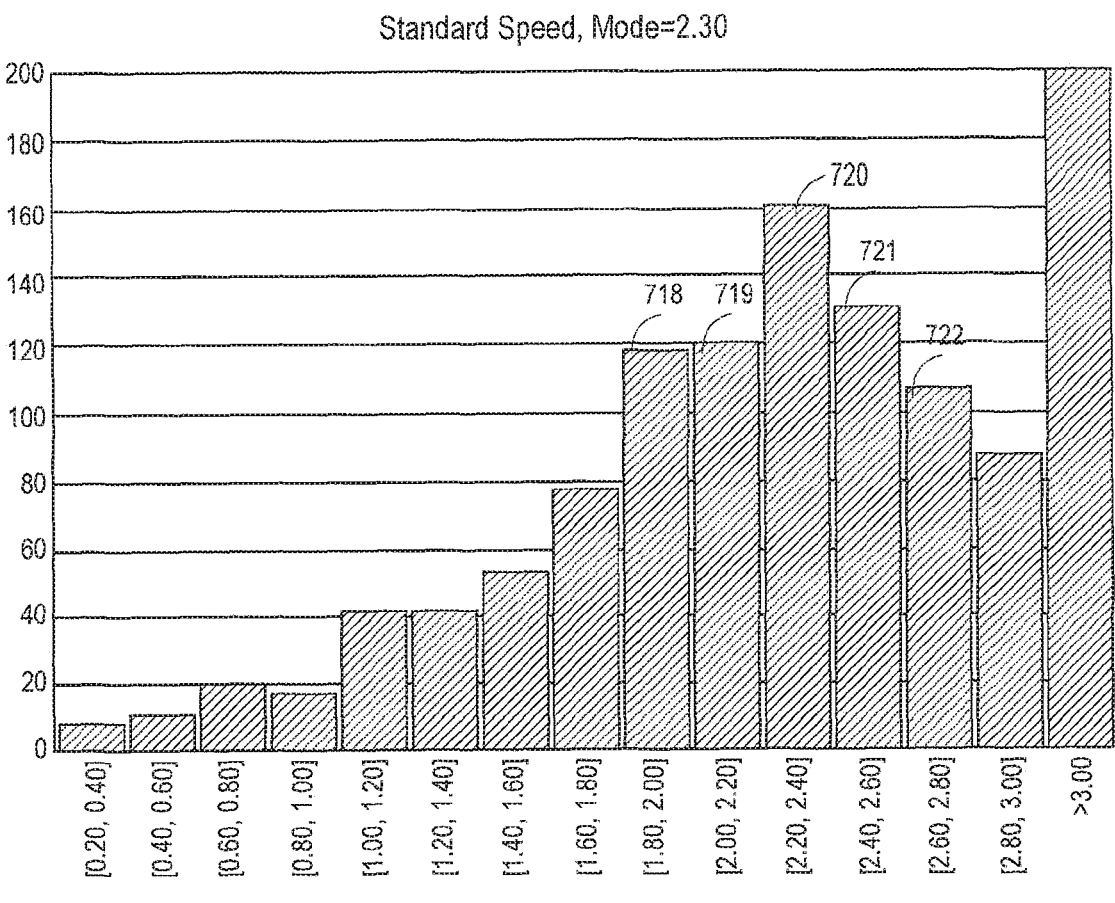
FIGS. 7A and 7B illustrate time length or time period of a seed or particle for different air speeds in accordance with one embodiment.
Figure 7B:
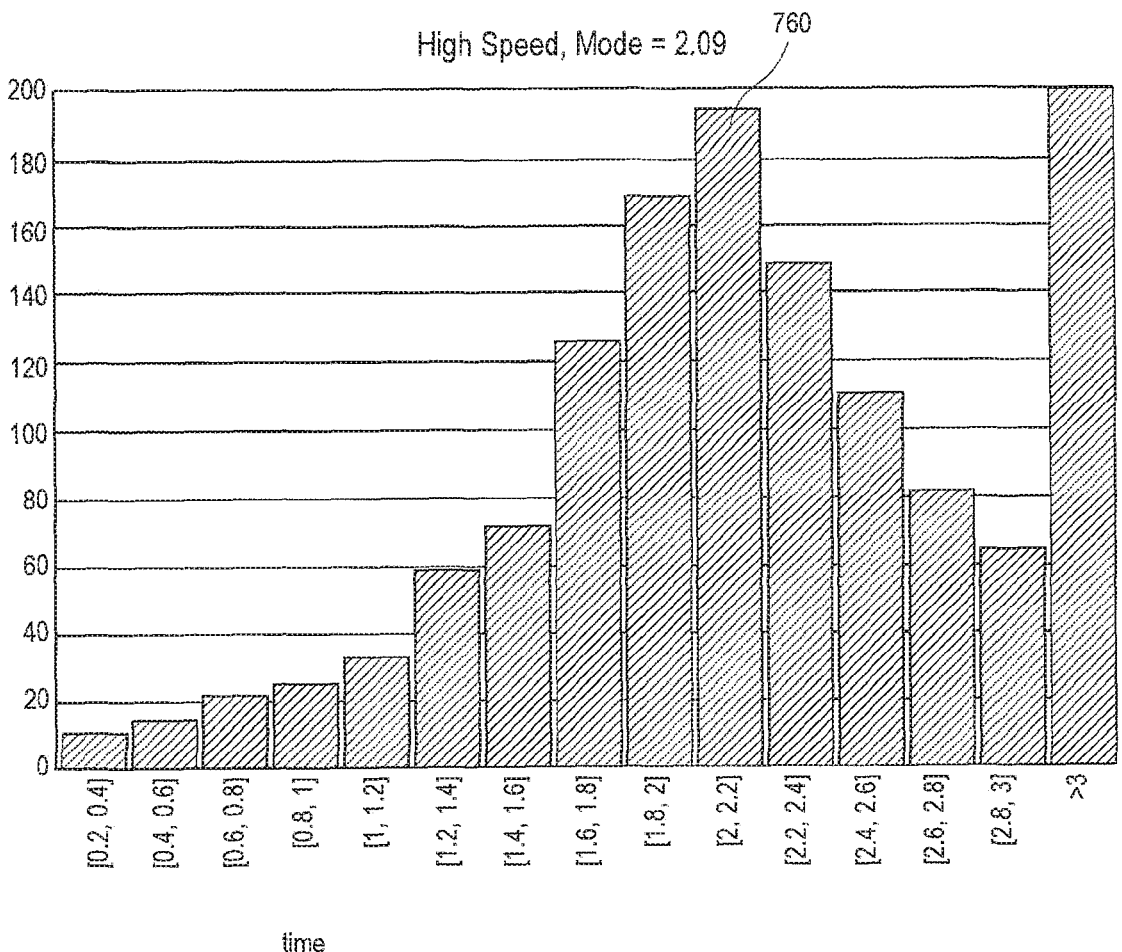

FIGS. 7A and 7B illustrate time period of a seed or particle that is sensed by an optical sensor for different air speeds in accordance with one embodiment. Product Rate did not change, but the air speed was increased from a standard air speed for FIG. 7A to a higher air speed for FIG. 7B. A vertical axis shows a number of occurrences for each time period that has been sorted into bins of data (e.g., 0.2 to 0.4 milliseconds, 0.4 to 0.6 milliseconds, etc.) and a horizontal axis shows time in milliseconds that seeds or particles block the light of the sensor. A peak column of data changes from 2.30 for peak column 720 to 2.09 for peak column 760 as a time length of a single particle blocking a sensor was smaller with the higher air speed. A shorter time period (e.g., 2.09 milliseconds) as illustrated in FIG. 7B indicates a faster seed or particle compared to a seed or particle of FIG. 7A. A higher air speed does not necessarily indicate that a seed or particle will bounce out of a trench or furrow.

An implement with numerous row units (e.g., 8, 16, etc.) has shorter product lines for row units close to a center or middle of an implement and longer product lines for row units near an edge of the implement. Thus, row units near a center or middle of the implement deliver product faster and have short time periods in FIGS. 7A and 7B.

A relative product speed can be determined based on average time period data of FIGS. 7A and 7B. In one example, an algorithm can determine the average time period and corresponding relative product speed based on adding peak column data x, adjacent column data x−1, adjacent column data x−2, adjacent column data x+1, and adjacent column data x+2 and then dividing this sum by a number of columns (5) that have been added.

In another example, an algorithm can determine the average time period and corresponding relative product speed based on adding peak column data x, adjacent column data x−1, adjacent column data x+1, and then dividing this sum by a number of columns (3) that have been added. The peak column data x can be peak column data 720 or peak column data 760.

In a specific example, the average time period is given by the following equation:

$$\text{(column data 718+column data 719+peak column data 720+column data 721+column data 722)/5.}$$

FIG. 8 illustrates a flow diagram of one embodiment for a method 800 of using blockage sensors to determine relative product speed (e.g., relative seed or particle speed). The method 800 is performed by processing logic that may comprise hardware (circuitry, dedicated logic, etc.), software (such as is run on a general purpose computer system or a dedicated machine or a device), or a combination of both. In one embodiment, the method 800 is performed by processing logic (e.g., processing logic 1226, processing logic 316) of an electrical control system (e.g., electrical control system 300, electrical control system 350, machine, apparatus, monitor 310 having CPU 316, module 320, display device, user device, self-guided device, self-propelled device, etc). The electrical control system or processing system (e.g., processing system 1220, 1262) executes instructions of a software application or program with processing logic. The software application or program can be initiated by the electronic control system or processing system. In one example, a monitor or display device receives user input and provides a customized display for operations of the method 800.

At operation 802, a software application is initiated on an electrical control system or processing system and displayed on a monitor or display device as a user interface. The electrical control system or processing system may be integrated with or coupled to a machine that performs an application pass (e.g., planting, tillage, fertilization). Alternatively, the processing system may be integrated with an apparatus (e.g., drone, image capture device) associated with the machine that captures images during the application pass.

At operation 804, the method performs an agricultural operation (e.g., planting, fertilization, etc.) with an implement. At operation 806, the method determines an output signal of at least one sensor (e.g., optical sensors, blockage sensors) of each row unit for sensing flow of a product (e.g., seed or particle) through a product line of an agricultural implement during an agricultural operation. This line supplies the product to an agricultural field. In one example, at operation 808, the method executes an algorithm (e.g., any examples of algorithms discussed herein) to determine an average time period of a particle that the product blocks light of a sensor. At operation 810, the average time period of a particle for each sensor on the same product can be used to determine a relative product speed through different lines and row units of the agricultural implement.

At operation 812, the method monitors a fan setting (or blower setting) of the implement and determines whether to adjust the fan setting based on the relative product speeds of the row units of the implement. The fan setting determines an air speed within the product lines. The method can automatically adjust the fan setting or a user can adjust the fan setting based on the relative product speeds of the row units of the implement. The relative product speed metric can be used to detect blockage in a product line or predict potential blockage for a product line. The relative product speed metric can also be used to optimize a fan speed (or fan speeds if more than 1 fan) for all row units and towers of an implement.

In one example, a user (e.g., operator, farmer, grower) can decide whether to adjust a fan speed based on a relative product speed for product lines of each row unit.

Figure 9:
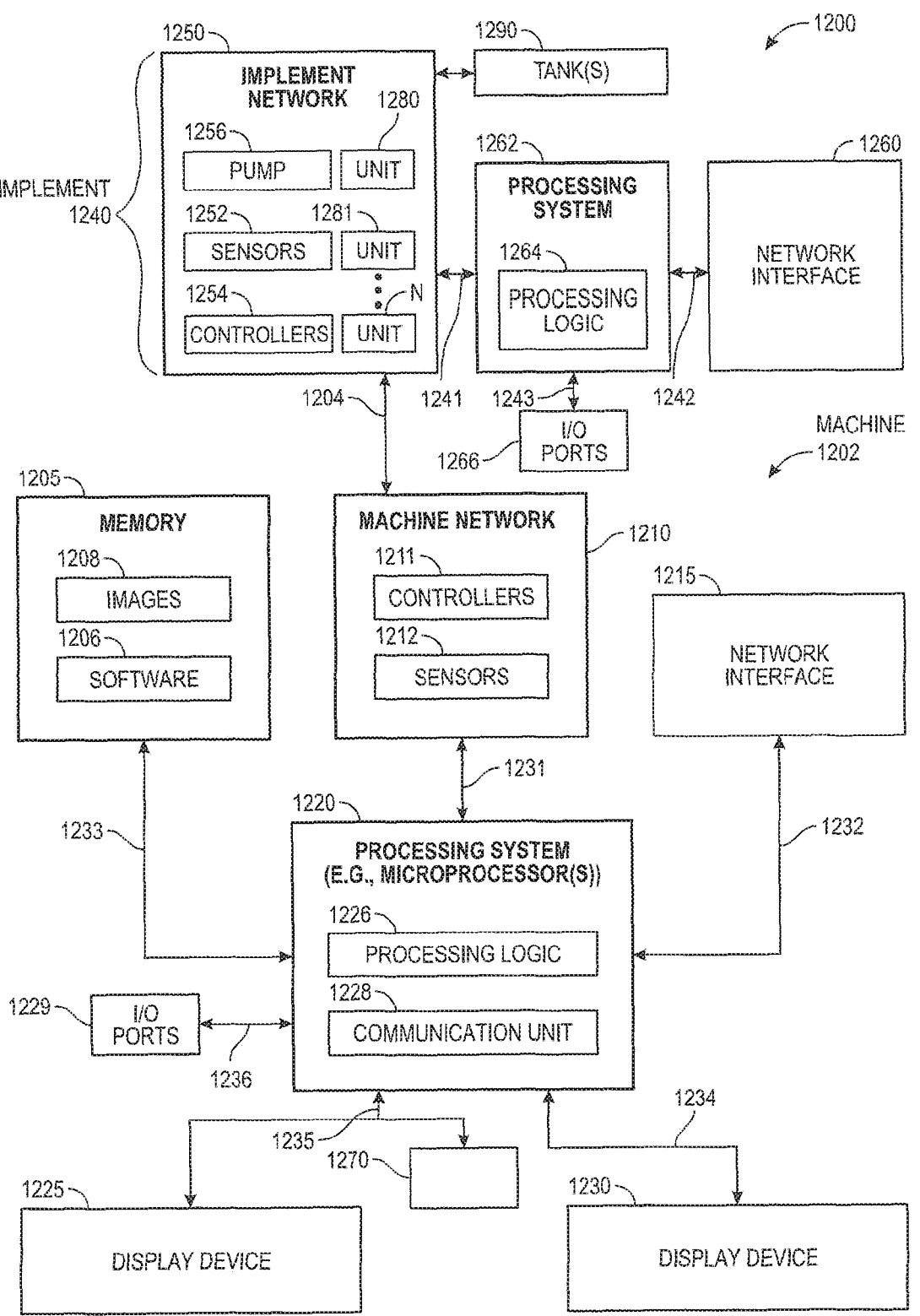
FIG. 9 shows an example of a system 1200 that includes a machine 1202 (e.g., tractor, combine harvester, etc.) and an implement 1240 (e.g., planter, sidedress bar, cultivator, plough, sprayer, spreader, irrigation implement, etc.) in accordance with one embodiment.

FIG. 9 shows an example of a system 1200 that includes a machine 1202 (e.g., tractor, combine harvester, etc.) and an implement 1240 (e.g., planter, sidedress bar, cultivator, plough, sprayer, spreader, irrigation implement, etc.) in accordance with one embodiment. The machine 1202 includes a processing system 1220, memory 1205, machine network 1210 (e.g., a controller area network (CAN) serial bus protocol network, an ISOBUS network, etc.), and a network interface 1215 for communicating with other systems or devices including the implement 1240. The machine network 1210 includes sensors 1212 (e.g., speed sensors, optical sensors), controllers 1211 (e.g., GPS receiver, radar unit) for controlling and monitoring operations of the machine or implement. The network interface 1215 can include at least one of a GPS transceiver, a WLAN transceiver (e.g., WiFi), an infrared transceiver, a Bluetooth transceiver, Ethernet, or other interfaces from communications with other devices and systems including the implement 1240. The network interface 1215 may be integrated with the machine network 1210 or separate from the machine network 1210 as illustrated in FIG. 9. The I/O ports 1229 (e.g., diagnostic/on board diagnostic (OBD) port) enable communication with another data processing system or device (e.g., display devices, sensors, etc.).

In one example, the machine performs operations of a tractor that is coupled to an implement for planting applications and seed or particle sensing during an application. The planting data and seed/particle data for each row unit of the implement can be associated with locational data at time of application to have a better understanding of the planting and seed/particle characteristics for each row and region of a field. Data associated with the planting applications and seed/particle characteristics can be displayed on at least one of the display devices 1225 and 1230. The display devices can be integrated with other components (e.g., processing system 1220, memory 1205, etc.) to form the monitor 300.

The processing system 1220 may include one or more microprocessors, processors, a system on a chip (integrated circuit), or one or more microcontrollers. The processing system includes processing logic 1226 for executing software instructions of one or more programs and a communication unit 1228 (e.g., transmitter, transceiver) for transmitting and receiving communications from the machine via machine network 1210 or network interface 1215 or implement via implement network 1250 or network interface 1260. The communication unit 1228 may be integrated with the processing system or separate from the processing system. In one embodiment, the communication unit 1228 is in data communication with the machine network 1210 and implement network 1250 via a diagnostic/OBD port of the I/O ports 1229.

Processing logic 1226 including one or more processors or processing units may process the communications received from the communication unit 1228 including agricultural data (e.g., GPS data, planting application data, soil characteristics, any data sensed from sensors of the implement 1240 and machine 1202, etc.). The system 1200 includes memory 1205 for storing data and programs for execution (software 1206) by the processing system. The memory 1205 can store, for example, software components such as planting application software or seed/particle software for analysis of seed/particle and planting applications for performing operations of the present disclosure, or any other software application or module, images (e.g., captured images of crops, seed, soil, furrow, soil clods, row units, etc.), alerts, maps, etc. The memory 1205 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

The processing system 1220 communicates bi-directionally with memory 1205, machine network 1210, network interface 1215, header 1280, display device 1230, display device 1225, and I/O ports 1229 via communication links 1231-1236, respectively. The processing system 1220 can be integrated with the memory 1205 or separate from the memory 1205.

Display devices 1225 and 1230 can provide visual user interfaces for a user or operator. The display devices may include display controllers. In one embodiment, the display device 1225 is a portable tablet device or computing device with a touchscreen that displays data (e.g., planting application data, captured images, localized view map layer, high definition field maps of different measured seed/particle data, as-planted or as-harvested data or other agricultural variables or parameters, yield maps, alerts, etc.) and data generated by an agricultural data analysis software application and receives input from the user or operator for an exploded view of a region of a field, monitoring and controlling field operations. The operations may include configuration of the machine or implement, reporting of data, control of the machine or implement including sensors and controllers, and storage of the data generated. The display device 1230 may be a display (e.g., display provided by an original equipment manufacturer (OEM)) that displays images and data for a localized view map layer, measured seed/particle data, relative product speed data, as-applied fluid application data, as-planted or as-harvested data, yield data, seed germination data, seed environment data, controlling a machine (e.g., planter, tractor, combine, sprayer, etc.), steering the machine, and monitoring the machine or an implement (e.g., planter, combine, sprayer, etc.) that is connected to the machine with sensors and controllers located on the machine or implement.

A cab control module 1270 may include an additional control module for enabling or disabling certain components or devices of the machine or implement. For example, if the user or operator is not able to control the machine or implement using one or more of the display devices, then the cab control module may include switches to shut down or turn off components or devices of the machine or implement.

The implement 1240 (e.g., planter, cultivator, plough, sprayer, spreader, irrigation implement, etc.) includes an implement network 1250, a processing system 1262, a network interface 1260, and optional input/output ports 1266 for communicating with other systems or devices including the machine 1202. The implement network 1250 (e.g., a controller area network (CAN) serial bus protocol network, an ISOBUS network, etc.) includes a pump 1256 for pumping fluid from a storage tank(s) 1290 to application units 1280, 1281, . . . N of the implement, sensors 1252 (e.g., radar, electroconductivity, electromagnetic, a force probe, speed sensors, seed/particle sensors for detecting passage of seed/particle, sensors for detecting characteristics of soil or a trench including a plurality of soil layers differing by density, a depth of a transition from a first soil layer to a second soil layer based on density of each layer, a magnitude of a density layer difference between soil layers, a rate of change of soil density across a depth of soil, soil density variability, soil surface roughness, residue mat thickness, a density at a soil layer, soil temperature, seed presence, seed spacing, percentage of seeds firmed, and soil residue presence, at least one optical sensor to sense at least one of soil organic matter, soil moisture, soil texture, and soil cation-exchange capacity (CEC), downforce sensors, actuator valves, moisture sensors or flow sensors for a combine, speed sensors for the machine, seed force sensors for a planter, fluid application sensors for a sprayer, or vacuum, lift, lower sensors for an implement, flow sensors, etc.), controllers 1254 (e.g., GPS receiver), and the processing system 1262 for controlling and monitoring operations of the implement. The pump controls and monitors the application of the fluid to crops or soil as applied by the implement. The fluid application can be applied at any stage of crop development including within a planting trench upon planting of seeds, adjacent to a planting trench in a separate trench, or in a region that is nearby to the planting region (e.g., between rows of corn or soybeans) having seeds or crop growth.

For example, the controllers may include processors in communication with a plurality of seed sensors. The processors are configured to process data (e.g., fluid application data, seed sensor data, soil data, furrow or trench data) and transmit processed data to the processing system 1262 or 1220. The controllers and sensors may be used for monitoring motors and drives on a planter including a variable rate drive system for changing plant populations. The controllers and sensors may also provide swath control to shut off individual rows or sections of the planter. The sensors and controllers may sense changes in an electric motor that controls each row of a planter individually. These sensors and controllers may sense seed delivery speeds in a seed tube for each row of a planter.

The network interface 1260 can be a GPS transceiver, a WLAN transceiver (e.g., WiFi), an infrared transceiver, a Bluetooth transceiver, Ethernet, or other interfaces from communications with other devices and systems including the machine 1202. The network interface 1260 may be integrated with the implement network 1250 or separate from the implement network 1250 as illustrated in FIG. 24.

The processing system 1262 communicates bi-directionally with the implement network 1250, network interface 1260, and I/O ports 1266 via communication links 1241-1243, respectively.

The implement communicates with the machine via wired and possibly also wireless bi-directional communications 1204. The implement network 1250 may communicate directly with the machine network 1210 or via the network interfaces 1215 and 1260. The implement may also by physically coupled to the machine for agricultural operations (e.g., seed/particle sensing, planting, harvesting, spraying, etc.).

The memory 1205 may be a machine-accessible non-transitory medium on which is stored one or more sets of instructions (e.g., software 1206) embodying any one or more of the methodologies or functions described herein. The software 1206 may also reside, completely or at least partially, within the memory 1205 and/or within the processing system 1220 during execution thereof by the system 1200, the memory and the processing system also constituting machine-accessible storage media. The software 1206 may further be transmitted or received over a network via the network interface 1215.

In one embodiment, a machine-accessible non-transitory medium (e.g., memory 1205) contains executable computer program instructions which when executed by a data processing system cause the system to perform operations or methods of the present disclosure. While the machine-accessible non-transitory medium (e.g., memory 1205) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present disclosure. The term "machine-accessible non-transitory medium" shall accordingly be taken to include, but not be limited to, solid-state memories, optical and magnetic media, and carrier wave signals.

Any of the following examples can be combined into a single embodiment or these examples can be separate embodiments.

In one example of a first embodiment, a processing system comprises memory to store sensor data and processing logic is coupled to the memory. The processing logic is configured to obtain sensor data from at least one sensor for sensing flow of a product through a product line of an agricultural implement and to determine a relative product speed for product flowing through the product line with respect to other product lines of the agricultural implement based on the sensor data.

In another example of the first embodiment, the processing logic is configured to determine an output signal from the sensor data of the at least one sensor and to determine an average time period of a particle of the product flowing through light of the at least one sensor of the product line.

In another example of the first embodiment, the processing logic is configured to determine relative product speeds through multiple product lines of a plurality of row units.

In another example of the first embodiment, the processing logic is configured to monitor a fan setting of a fan that controls an air speed through the multiple product lines of the implement.

In another example of the first embodiment, the processing logic is configured to determine whether to adjust the fan setting based on the relative product speeds through the multiple product lines of the plurality of row units.

In another example of the first embodiment, the product comprises seed or fertilizer.

In another example of the first embodiment, the processing logic is configured to determine an average time period of a single particle of the product by executing an algorithm to add a most frequently occurring time period data and adjacent time period data that is adjacent to the most frequently occurring time period data.

In one example of a second embodiment, an electrical control system comprises at least one blockage sensor for sensing flow of seeds or particles of a seed or particle line of an agricultural implement, a module to receive sensor data from the at least blockage sensor, and processing logic coupled to the module. The processing logic is configured to determine a relative seed or particle speed for seeds or particles flowing through the seed or particle line with respect to other seed or particle lines of the agricultural implement based on the sensor data.

In another example of the second embodiment, the processing logic is configured to determine an output signal from the sensor data of the at least one blockage sensor and to determine an average time period of a particle of the seeds or particles flowing through light of the at least one blockage sensor of the seeds or particles line.

In another example of the second embodiment, the processing logic is configured to determine relative seed or particle speeds through multiple seed or particle lines of a plurality of row units.

In another example of the second embodiment, the processing logic is configured to monitor a fan setting of a fan that controls an air speed through the multiple seed or particle lines of the implement.

In another example of the second embodiment, the processing logic is configured to determine whether to adjust the fan setting based on the relative seed or particle speeds through the multiple seed or particle lines of the plurality of row units.

In another example of the second embodiment, the seeds or particles comprise corn, wheat, sorghum, barley, oats, canola, or fertilizer.

In another example of the second embodiment, the processing logic is configured to determine an average time period of a particle of the seeds or particles by executing an algorithm to add a most frequently occurring time period data and adjacent time period data that is adjacent to the most frequently occurring time period data.

In one example of a third embodiment, a computer implemented method comprises determining an output signal of at least one sensor of a row unit for sensing flow of a product through a product line of an agricultural implement during an agricultural operation and determining an average time period of a particle of the at least one sensor sensing the product flowing through the product line based on the output signal.

In another example of the third embodiment, the computer implemented method further comprises using the average time period of a particle for the at least one sensor of the row unit on the same product to determine a relative product speed through the product line with respect to other product lines of the row unit of the agricultural implement.

In another example of the third embodiment, the computer implemented method further comprises determining output signals of multiple sensors of a plurality of row units for sensing flow of a first product through product lines and for sensing flow of a second product through the product lines of the agricultural implement during the agricultural operation.

In another example of the third embodiment, the computer implemented method further comprises determining a first average time period of a particle of the first product and determining a second average time period of a particle of the second product for each sensor sensing the first and second products flowing through the product lines based on the output signals.

In another example of the third embodiment, the computer implemented method further comprises using the first average time period of a particle of the first product to determine a relative first product speed through each product line with respect to other product lines of the plurality of row units of the agricultural implement and using the second average time period of a particle of the second product to determine a relative second product speed through each product line with respect to other product lines of the plurality of row units of the agricultural implement.

In another example of the third embodiment, the computer implemented method further comprises monitoring a fan setting of the implement, determining whether to adjust the fan setting based on the relative first product speeds of the first product of the plurality of row units of the implement, and determining whether to adjust the fan setting based on the relative second product speeds of the second product of the plurality of row units of the implement.

In another example of the third embodiment, the computer implemented method further comprises using the relative first and second product speeds to detect blockage in a product line or predict potential blockage for a product line.

What is claimed is:

1. A processing system comprising:
memory to store sensor data; and
processing logic coupled to the memory, the processing logic including one or more hardware processors is configured to determine a relative product speed through a first product line and a relative product speed through a second product line of a plurality of row units of an agricultural implement by:
obtaining sensor data from at least one sensor for sensing flow of a product through the first product line of the agricultural implement and determining an output signal from the sensor data of the at least one sensor to determine an average time period that particles of the product block light of the the at least one sensor of the first product line to determine the relative product speed for the product flowing through the first product line with respect to other product lines including the second product line of the agricultural implement based on the sensor data, wherein the processing logic is configured to determine the average time period that the particles of the product block light of the at least one sensor based on executing an algorithm to add a most frequently occurring time period data having a number of occurrences of most frequently occurring time periods and adjacent time period data that is adjacent to the most frequently occurring time period data, wherein the agricultural implement comprises a planter, a sidedress bar, a cultivator, a plough, a sprayer, a spreader, or an irrigation implement.

2. The processing system of claim 1, wherein the processing logic is configured to determine the relative product speed for the product through the first product line compared to the relative product speed through the second product line and to determine a relative product speed for the product through a third product line of multiple product lines of the plurality of row units.

3. The processing system of claim 2, wherein the processing logic is configured to monitor a fan setting of a fan that controls an air speed through the multiple product lines of the implement.

4. The processing system of claim 3, wherein the processing logic is configured to determine whether to adjust the fan setting based on the relative product speeds through the multiple product lines of the plurality of row units.

5. The processing system of claim 1, wherein the product comprises seed or fertilizer.

6. The processing system of claim 1, wherein the processing logic is configured to determine the average time period of the particle of the product by executing the algorithm to add a most frequently occurring time period data having a number of occurrences of most frequently occurring time periods in a first bin and adjacent time period data in a second bin that is adjacent to the most frequently occurring time period data and dividing by a number of bins being added.

7. An electrical control system comprising:
at least one blockage sensor for sensing flow of seeds or particles of a first seed or particle line of an agricultural implement;
a control module to receive sensor data from the at least one blockage sensor; and
processing logic coupled to the control module, the processing logic including one or more hardware processors is configured to determine a relative seed or particle speed for seeds or particles flowing through the first seed or particle line with respect to other seed or particle lines of the agricultural implement based on
obtaining the sensor data from the at least one blockage sensor for sensing flow of the seeds or particles through the first seed or particle line of the agricultural implement and determining an output signal from the sensor data of the at least one blockage sensor to determine an average time period that seeds or particles block light of the the at least one blockage sensor, wherein the processing logic is configured to determine the average time period that the seeds or particles block light of the at least one blockage sensor based on executing an algorithm to add a most frequently occurring time period data having a number of occurrences of most frequently occurring time periods and adjacent time period data that is adjacent to the most frequently occurring time period data, wherein the agricultural implement comprises a planter, a sidedress bar, a cultivator, a plough, a sprayer, a spreader, or an irrigation implement.

8. The electrical control system of claim 7, wherein the processing logic is configured to determine the relative seed or particle speed for the product through the first seed or particle line compared to a relative seed or particle speed through a second seed or particle line of multiple seed or particle lines of a plurality of row units of the agricultural implement.

9. The electrical control system of claim 8, wherein the processing logic is configured to monitor a fan setting of a fan that controls an air speed through the multiple seed or particle lines of the agricultural implement.

10. The electrical control system of claim 9, wherein the processing logic is configured to determine whether to adjust the fan setting based on the relative seed or particle speeds through the multiple seed or particle lines of the plurality of row units.

11. The electrical control system of claim 7, wherein the seeds or particles comprise corn, wheat, sorghum, barley, oats, canola, or fertilizer.

12. The electrical control system of claim 7, wherein the processing logic is configured to determine the average time period of the seed or particle by executing the algorithm to add a most frequently occurring time period data having a number of occurrences of most frequently occurring time periods in a first bin and adjacent time period data in a second bin that is adjacent to the most frequently occurring time period data.

13. A computer implemented method comprising:

determining an output signal of at least one sensor of a row unit for sensing flow of a first product through a first product line of an agricultural implement during an agricultural operation; and determining a first average time period that the first product blocks light of the at least one sensor sensing the first product flowing through the first product line based on the output signal and based on executing an algorithm to add a most frequently occurring time period data having a number of occurrences of most frequently occurring time periods of the output signal and adjacent time period data that is adjacent to the most frequently occurring time period data, wherein the agricultural implement comprises a planter, a sidedress bar, a cultivator, a plough, a sprayer, a spreader, or an irrigation implement.

14. The computer implemented method of claim 13, further comprising:

using the first average time period for the at least one sensor of the row unit on the first product to determine a first relative product speed through the first product line with respect to other product lines of the row unit of the agricultural implement.

15. The computer implemented method of claim 13, further comprising:

determining output signals of multiple sensors of a plurality of row units for sensing flow of the first product through product lines having the first product and for sensing flow of a second product through the product lines having the second product of the agricultural implement during the agricultural operation.

16. The computer implemented method of claim 15, further comprising:

determining the first average time period of the first product blocking light of a first sensor and determining a second average time period of the second product blocking light of a second sensor for the first and second products flowing through the product lines based on the output signals.

17. The computer implemented method of claim 16, further comprising:

using the first average time period of the particle of the first product to determine a relative first product speed for the first product through the first product line having the first product with respect to other product lines having the first product of the plurality of row units of the agricultural implement; and using the second average time period of the particle of the second product to determine a relative second product speed for the second product through a second product line with respect to other product lines having the second product of the plurality of row units of the agricultural implement.

18. The computer implemented method of claim 17, further comprising:

monitoring a fan setting of the implement;

determining whether to adjust the fan setting based on the relative first product speeds of the first product of the plurality of row units of the implement; and determining whether to adjust the fan setting based on the relative second product speeds of the second product of the plurality of row units of the implement.

19. The computer implemented method of claim 17, further comprising:

using the relative first and second product speeds to detect blockage in the first and second product lines or predict potential blockage for the first and second product lines.

* * * * *